STEEL SHELVING

Original Filed Sept. 18, 1967 3 Sheets-Sheet 1

INVENTOR.
IRWIN J. FERDINAND
BY MILTON E. HANDLER
Haubaugh & Thomas.
ATTYS.

INVENTOR.
IRWIN J. FERDINAND
MILTON E. HANDLER
BY Harbaugh and Thomas
ATTYS

STEEL SHELVING

Original Filed Sept. 18, 1967 3 Sheets-Sheet 3

INVENTOR.
IRWIN J. FERDINAND
MILTON E. HANDLER
BY
Harbaugh & Thomas
ATTYS

United States Patent Office

Re. 27,160
Reissued Aug. 10, 1971

27,160
STEEL SHELVING

Irwin J. Ferdinand, Glencoe, and Milton E. Handler, Evanston, Ill., assignors to Hirsh Company Original No. 3,479,975, dated Nov. 25, 1969, Ser. No. 668,433, Sept. 18, 1967. Application for reissue Jan. 19, 1970, Ser. No. 3,251
Int. Cl. A47b *95/08, 3/06*
U.S. Cl. 108—144 17 Claims

Matter enclosed in heavy brackets [ ] appears in the original patent but forms no part of this reissue specification; matter printed in italics indicates the additions made by reissue.

ABSTRACT OF THE DISCLOSURE

Knockdown lightweight steel shelving in which cut ends of corner notched shelf flanges are clamped securely against adjacent sides of a roll-formed upright corner post having improved form lines for continuous shelving with wedge activated tension elements manually applied from a position internally of the shelves.

Ferdinand et al., 3,255,722, June 14, 1966; Ferdinand et al., app. Ser. No. 658,695.

As background, it is recognized that in adjustable steel shelving for a continuous row of shelving units, difficulty is generally experienced in relocating shelves in one unit without disturbing shelves in adjacent units where horizontally adjacent shelves have corner posts in common between them for economy.

Moreover, since the strength of a column to withstand axial compression is related to its slenderness ratio (L/r), where "L" is its length between lateral support points and "r" is its radius of gyration, the presence of plural holes or openings in the post wall, required at each adjustment level for securing several shelves at selected identical levels, substantially reduces the rated strength of the posts to the cross sectional area of the metal remaining between the holes. Strengthening the metal by increasing post thickness involves increased total weight for all posts, expense, tool and shipping costs for handling the heavier posts.

Many desirable results are derived where single corner posts are utilized as unitizing supports interconnecting horizontally adjacent shelves. Not only is the slenderness ratio (L/r) of the posts improved by an increased number of vertically spaced, lateral support points of contiguous shelves in a plurality of directions and levels, but with each post laterally and rigidly braced in two or more directions, improvements can be provided in the rolled-form post construction itself, to lighten it economically and also to provide it with greater strength against axial compression.

In the present invention there is less removal of metal for multiple securement apertures at each level notwithstanding that there are at least twice as many wall apertures in a unitizing post as in a shelving post made solely for single shelving unit use. Moreover, the effective radius of gyration (r) of the post is improved notwithstanding a minimized reduction in the transverse sectional area of the post at the fastening apertures.

In brief, a single shelving unit post can be used for a double load in multiple unit shelving assemblies, and vice versa, with economy in weight and cost. A novel corner configuration for a multiple corner post is provided which can be used for any quarter, half or full section post, viz, securement apertures are narrowed horizontally and elongated in a vertical direction between closely spaced work hardened rib-like structure and the securement force can be assimilated on rib-like corner edges of non-apertured sides so that corner-notched shelf flanges will abut under clamping pressure at right angles against two non-apertured sides that are contiguous to the apertured side in mutually lateral supporting relationship.

However, in this connection it should also be noted that shelving constructions which leave little to be desired from appearance and functional points of view have been rejected for lack of ease of assembly and shelf level adjustments. Consumers upon occasion have been obliged to return to the seller for assistance in erecting the shelving, and sometimes even the seller has been unable to enlighten the consumer unless previously given instruction by the manufacturer. Any bafflement, confusion or uncertainty of the purchaser is an obstacle to repeat sales. It follows therefore that the simpler the erection procedure involved in connection with a given design of shelving, the more favorable will be its reception on the competitive market.

The present invention is further designed with maximun economics in time and expense to overcome many of the limitations that are attendant upon the construction and use of lightweight knockdown steel shelving now on the market, and, toward this end, the invention contemplates the provision of novel continuous shelving units which offer readily discerned ease and speed of assembly advantages over present day shelving units without loss of appearance, safety and rigidity.

More particularly, in carrying out the invention, the shelves are provided on all sides with downturned marginal strengthening flanges of determined design ranging from a single thickness flange to compound flanges of multiple thickness, or full box design. Thus, extreme rigidity is offered in the long and transverse directions of the shelves. The corners of the shelves are notched or cut-away to expose the end edges of the flanges and the exposed cut ends thereof are designed for clamped rigidifying engagement squarely against the corner posts.

The cut ends of the shelf flanges at each notched corner are crossbraced by a diagonal bracket interconnecting them to exert clamping pressure between the flange ends abutting against non-apertured post sides. The clamping pressure is exerted by tension members having ears at one end extending into the post through a laterally narrow aperture and then quarter-turned to span the vertical sides of the post aperture in interlocking relation. The other end of the tension member has a bent member such as a loop or hook form defining a bight received through a hole in the bracket. In this orientation the bight receives a wedge between it and the bracket which drives the bracket and through the bracket the flange ends into rigid engagement with the post walls.

The invention is characterized by the need of only one aperture in a shelf support column for attaching and servicing a shelf securing means.

The tension member is inserted through the hole in the bracket and manipulated from within the confines of the shelf to enter a post aperture and properly locate the ears within the aperture at a selected level. Moreover, the wedge is applied to the bight from within the shelf to quarter turn the ears into their operative position, and the wedge is also applied from within the shelf for movement, preferably in a horizontal direction, to tension and hold the tension member in its working position.

The invention contemplates a fastening bracket assembled to each corner of a shelf with a single movement and releasably retained in three planes at the shelf corners to receive the novel tension member arrangement, as applied by rectilineal movement and a quarter turn, with a wedge element tightening it and holding it n correct orientation to maintain the clamping relationship.

Another characteristic of the invention is an increase in he rigidity of the corner and its securement to the supporting column as the weight supportable on the shelf s increased.

The invention contemplates maximum economy in expense and assembly time, or adjustment with an ease and speed of assembly readily discerned by purchasers who nay be unskilled mechanically, and without loss of appearance, safety and rigidity.

A further object of the invention is to provide a post construction which not only provides an excellent appearance but one which can easily and readily receive slipped n finishing strips for decor if desired.

The features of the present invention which are believed to be novel are set forth with particularity in the appended claims. The formation inter-relationship, and securement of the steel shelving construction of this invention, together with further objects and advantages thereof, may best be understood by reference to the following description taken in connection with the accompanying drawings, in the several figures of which like reference numerals identify like elements, and in which:

FIGS. 8a, 8b and 8c are views showing one embodiment of the tension means in which FIGS. 8c and 8b show a U-shaped element in its resting inserted position and its secured orientation, respectively; and FIG. 8 is a view from inside the post showing the interlocking relation with the post with a vertical aperture.

Figure 9A:
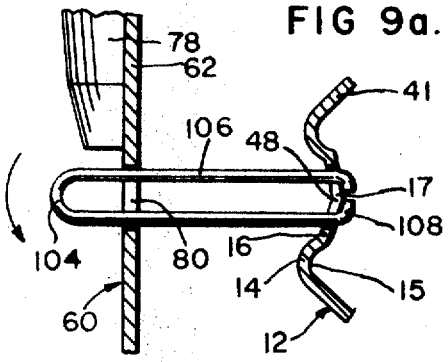
Figure 8A:
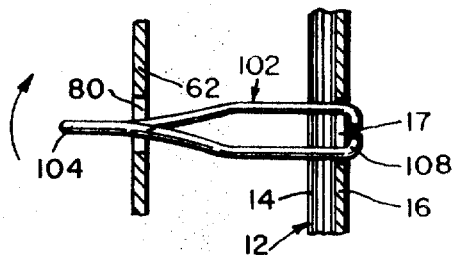
Figure 9C:
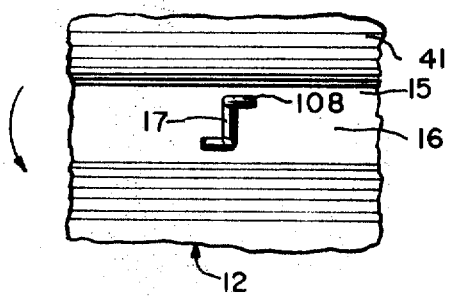
Figure 8C:
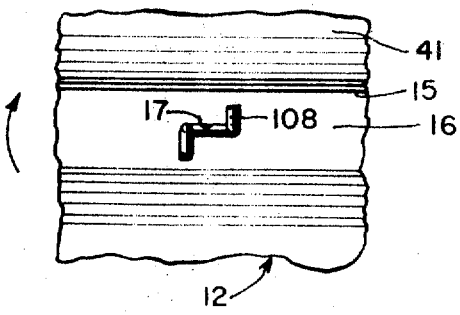
Figure 9B:
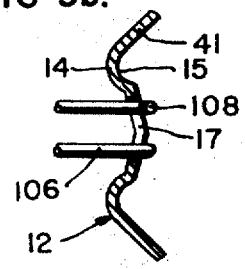
Figure 8B:
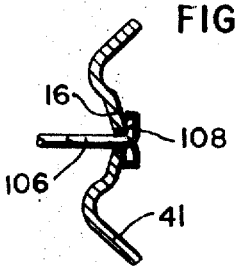

FIGS. 9a to c are views similar to FIGS. 8a–c showing the structure and relation of a U-shaped element if used for a horizontally elongated aperture.

Figure 10A:
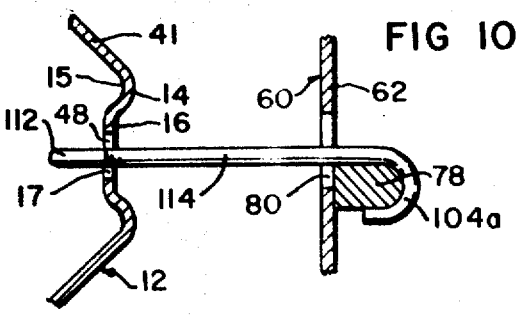
Figure 10C:
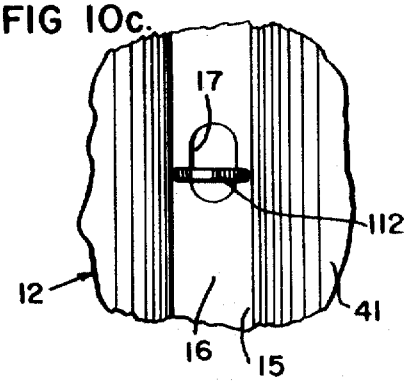
Figure 10B:
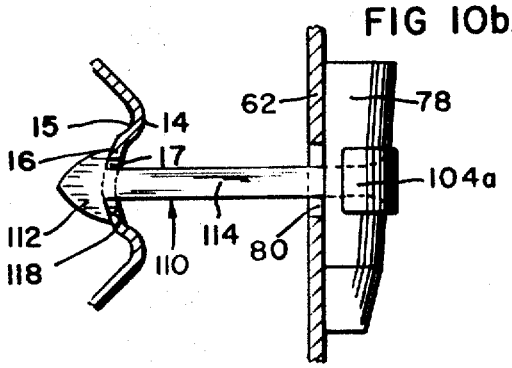

FIGS. 10a to c are views similar to FIGS. 8a–c showing the structure and relation of a stamped form of a tension means for a vertically elongated aperture.

Figure 11:
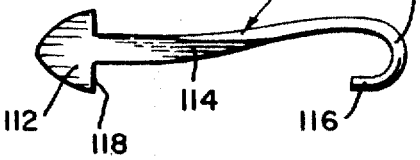

FIG. 11 is a plan view which shows a stamped form of a tension means for substituted use in FIGS. 9a–c.

Figure 7:
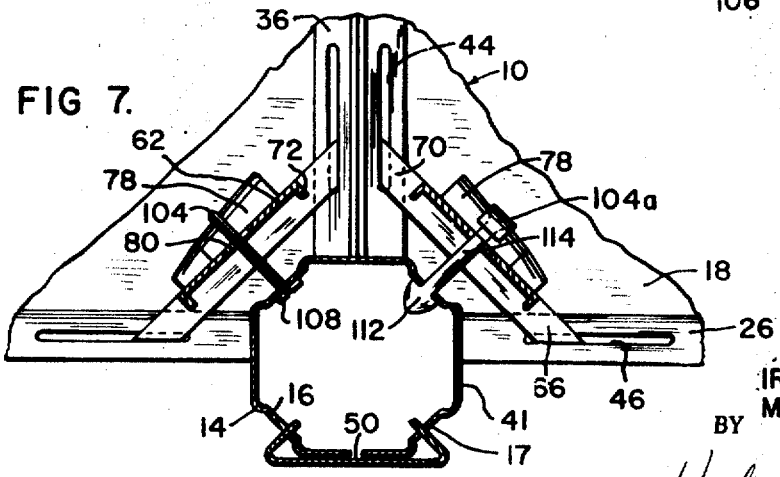
FIG. 7 is a fragmentary partially horizontally sectional view illustrating the unitizing relationship of abutting shelves with a supporting post embodying the invention as secured alternatively by tension means embodying the invention and including the optional snap-on decor strip on the front face.
Figure 12:
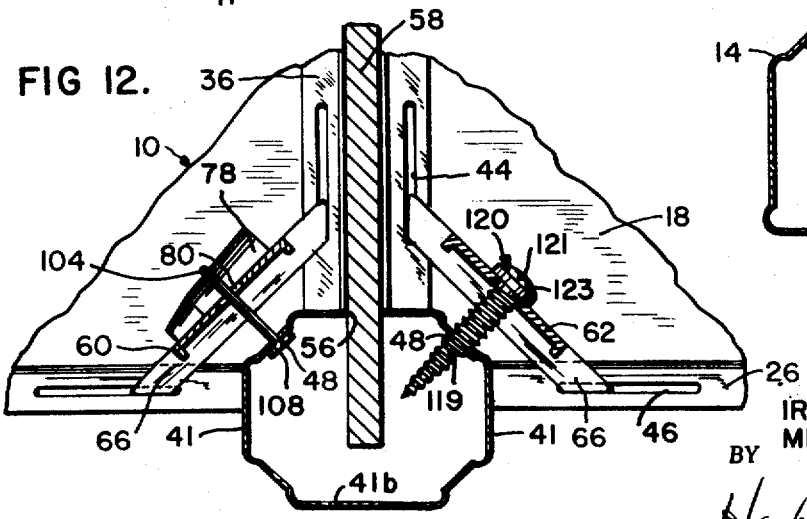

FIG. 12 is a view similar to FIG. 7 showing the use of a post embodying the invention for use with panel separations between shelf ends of continuous shelving, as well as outside ends.

Figure 13:
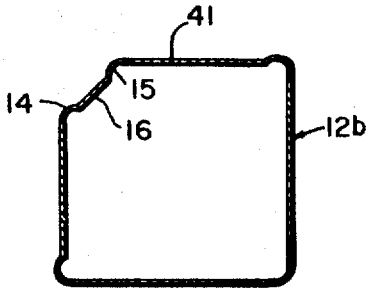

FIG. 13 is a sectional view which shows a modification of the post for single shelving unit installations if ordered as such.

Figure 14:
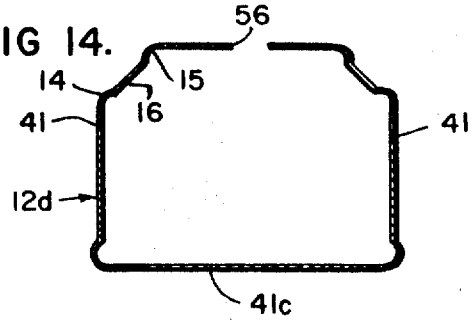

FIG. 14 is a sectional view which shows a modification of the post of FIG. 12 if a flat front is desired.

Figure 6:
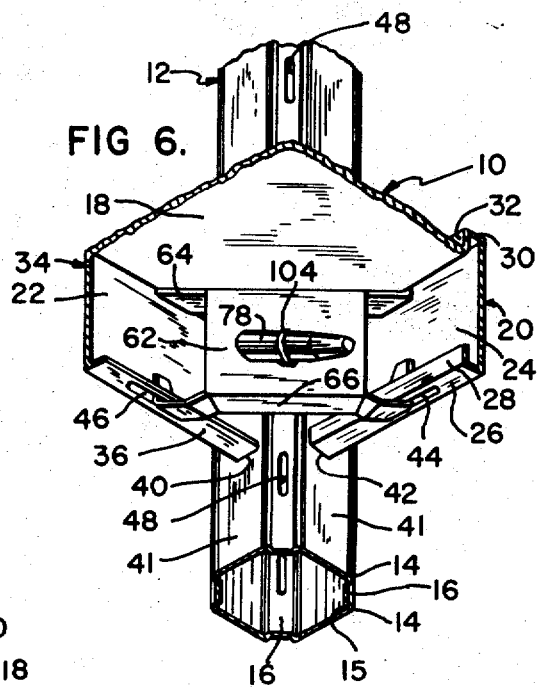
FIG. 6 is a fragmentary perspective view from inside and below the shelf illustrating the relationship of the shelf shown in FIG. 2 when in the secured position held by the fastening clip of FIG. 3 and a tension means against a supporting post.
Figure 16:
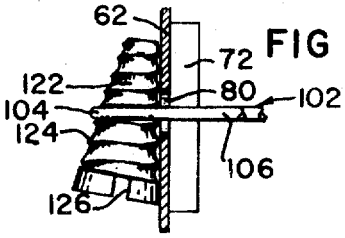
Figure 15:
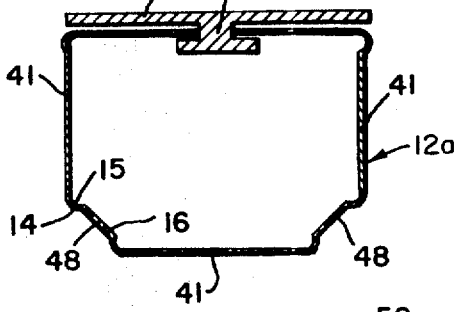

FIG. 15 shows another modification for receiving a decor finishing strip for a single post in continuous shelving, the finish strip being furnished as an integrated portion thereof when shipped, and FIG. 16 is a view similar to FIG. 8 showing another modification of the wedging means shown in FIGS. 6 and 7.

Figure 1:
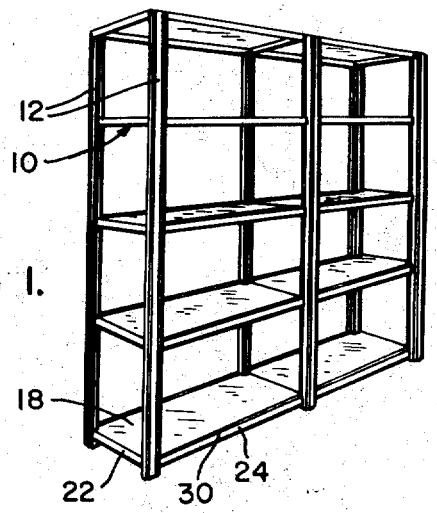
FIG. 1 is a front perspective view of a continuous steel shelving embodying the invention.
Figure 2:
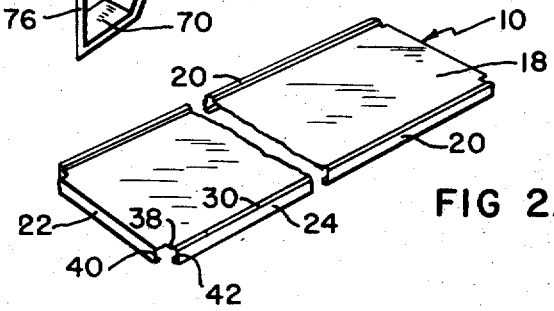
FIG. 2 is a fragmentary front perspective view of the shelf which is secured to the supporting post.

Referring now more particularly to FIGS. 1, 2 and 6, the shelf 10, preferably roll formed from coated sheet metal, is secured at its four corners to the supporting columns 12 sometimes referred to herein as posts. The shelf 10 is preferably rectangular and has an upper planar surface or top portion 18 with contiguous depending peripheral side flanges 20 and end flanges 22. The side and end flanges 20 and 22 define the features of the shelf and greatly increase the strength and rigidity of the shelf for load bearing purposes.

As best seen in FIG. 6, the side flanges 20 provide a substantially L-shaped configuration having an outer vertical portion 24 with a lower inwardly turned marginal edge 26 thereof terminally bent upwardly to provide a lower portion 28 normal to the planar portion 18 and with the periphery 28 thereof in a spaced parallel relationship with the outer portion 24. Preferably, the upper edge of the side flanges 20 are upwardly offset from the plane of the shelf, as at 30, to provide a shoulder 32 which prevents inward movement of the outer portion 24 under load conditions. The raised elevation of shoulder 32 also serves as a low rail to hold articles on the shelves.

The end flanges 22 also provide an L-shaped flange portion having an outer portion 34 with the lower marginal portion inwardly bent to provide a lower portion 36. The end flanges are not provided with an elevated shoulder above the planar portion 18 since it is often desirable to place several shelves into an end-to-end coplanar abutting relationship.

Each of the four corners of the shelf 10 are notched out to provide a recessed opening 38 defined by an end flange edge 40 and side flange edge 42. Each of the recessed openings 38 receive an angular portion of a supporting column 12 for securement as will be described.

A fastener securing aperture 44 is formed through the lower portion 26 of the side flanges at a predetermined distance from the edge 42 defining the recessed opening. A similar fastener securing aperture 46 is formed through the lower portion 36 of the end flange 22 at a predetermined distance from the edge 40 and for the clip embodiment shown in FIG. 5 other apertures can be made in the shoulder 32 and at the top of flange 22 if desired adjacent to the inner corner of the recessed opening 38. The apertures 44 and 46 are preferably elongated to receive rectangular tabs on a fastening clip to be described.

Referring to the cross-sectional structure of the supporting columns 12 shown in FIGS. 6 to 15, such may be one or the other of two preferred forms. The two basic embodiments relate to the shape of the column portion that is received directly opposite to the deep portion of the shelf notch 38, namely 16 (FIG. 6) or 17 (FIG. 9a), as located between wall portions 41 of the column that are at right angles to each other as engaged by the flange end edges 40 and 42. Both embodiments have spaced adjacent form lines 14, each preferably defining an internally acute angle 15, interconnected by a wall portion which is either flat as at 16 or internally convex as at 17.

More particularly, the column construction can be used at any one or more of the four corners of a column such as shown in FIGS. 6, 7 and 12 wherein a strip of heavy metal is roll-formed to provide at each corner, where desired, spaced form lines 14 interconnected by the diagonally disposed intermediate wall 16 medially perforated by equally spaced vertically elongated apertures 48 to permit vertical adjustment of the shelves. As noted in FIGS. 13, 14 and 15, if fewer than four shelf corners are going to be attached to each post, as with four post shelving, only those corners need be provided with the form lines 14 and an intermediate wall 16 that are going to be used. However, where the post is to be used in common with horizontally spaced shelves two or more post corners will be so equipped.

As shown in FIG. 7 the intermediate wall 16 is flat but slightly offset inwardly from the form lines 14. In FIG.

9a the intermediate wall 17 is inwardly convex. It is preferred that the fastening tension element be constructed to engage in the form line grooves when spanning the sides of the apertures as later described.

In forming the post from strip metal, the edges may abut medially at a side face as shown in FIG. 7 at 50, or be separated just far enough as shown in FIG. 15 to receive the leg 52 of a T-section finishing strip 54 therein externally of the shelving, or separated as at 56 in FIGS. 12 and 14 where posts are opposite each other to receive a panel 58. Otherwise, the joint can be disposed in a position concealed from view with only a full face 41 exposed. Preferably the post is formed to a cross-sectional design which is essentially octagonal as shown in FIGS. 6, 7 and 12 wherein the radius of gyration of the resulting column is minimal for the greatest strength with the least mass area as compared with a square section. The preferred forms of the invention approach a circle wherein the axis and radius of gyration correspond. These factors plus the work hardened form lines or ribs 14 minimize the amount of metal required for light metal shelving.

Figure 3:
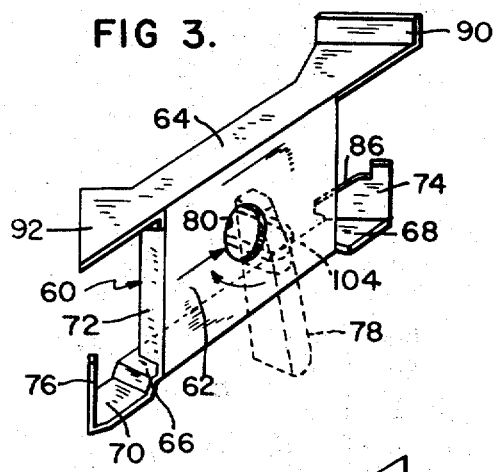
FIG. 3 is a perspective view of a fastening clip employed with the invention as viewed from inside the shelf.
Figure 4:
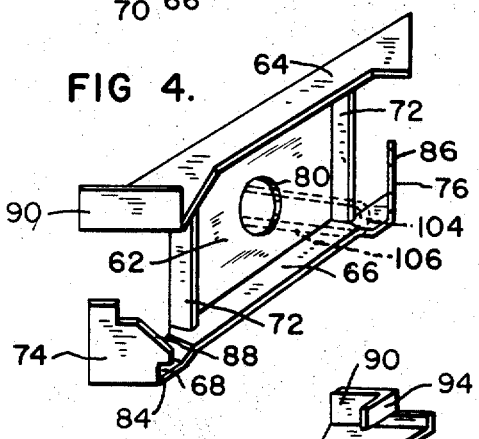
FIG. 4 is a perspective view of the clip in FIG. 3 taken from the post side thereof.

Referring now to the fastening clip such may be formed from heavy metal strip similar to one of the general forms shown in said Patent 3,255,722 in that the clip 60 (FIGS. 3 and 4) provides a planar portion 62 having top and bottom horizontal flanges 64 and 66 extending towards the post. The lower flange 66 terminates in identical wing portions 68 and 70 angularly formed at both ends thereof preferably at 45° to the planar portion. Vertical stiffening flanges 72 are formed on the vertical edges of the body portion 62. The wing portions 68 and 70 extend a substantial distance past the lower edge of the body portion 62 to define tab members 74 and 76 disposed at an angle of 45° to the planar portion 62 but co-planar with the respective shelf flanges. Camming surfaces 86 and 88 are provided on the inside of tabs 74 and 76 where they are inclined toward the ends of the tabs to direct and guide an angled insertion of the tabs snugly into the slots 44 and 46 on the shell flanges and position the ends of the tabs properly in the apertures 44 and 46 when the clamp is assembled to the shelf and the flanges and clip are drawn tightly together. At the base of the surfaces 86 and 88 spaces 84 are notched out to provide shoulders which hold the clip in place when assembled.

The upper flange 64 on the planar body 62 is located to rest against the flat portion 18 of the shell. An aperture 80 is centrally formed through the body portion 62 for alignment with the aperture 48 in the supporting columns when the clip 60 is properly positioned in the shelf ready for securement. This securement is best shown in FIGS. 7, 10a and 10b, wherein clip 60 is resiliently secured to each of the corner portions of the shelves 10 and a tension member 82 is inserted through both apertures 56 and 80 from inside the flanges below the top portion 18 of the shelf.

Two relationships of the clip are contemplated in which one upper flange 64 is the mirror of the other where the height of the shelf flanges differ, one only being described. If the height of the shelf flange was the same, the upper flanges 64, and consequently the clips would be identical. As it is, the upper flange 64 of the clip has a bearing surface at either end mating with the tops of the shelf flanges to stress the shelf in the direction of the supporting column thereby insuring rigidity when the tension member 82 is tightened. The edge 92 at one end of the upper flange 64 serves as a bearing surface engaging in the corner between the top plane 18 and side flange 22 of the shelf 10, and the other end of the upper portion 64 is constructed with the ear 90 to engage in the upper corner contour of the top portion 18 and side flange 20 of the shelf 10. In this particular instance an upstanding ear 90 is offset from the portion 64 and formed at right angles to it. Both bearing elements are disposed at approximately 45° to the plane of portion 62.

Figure 5:
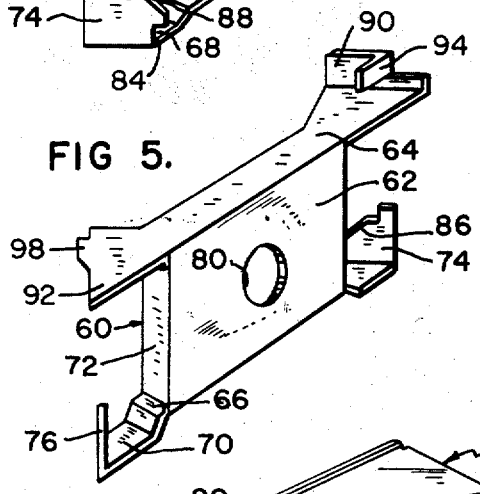
FIG. 5 is a perspective view of a modified form of embodiment of the fastening clip shown in FIG. 3.

A modification of this clip is shown in FIG. 5 in which an inwardly extending tab 94 is struck from the ear 90 to engage in a small aperture 96 in the inner shoulder 32 of the flange 20 and a laterally extending tooth 98 is provided on the edge 92 to engage in a lateral aperture 100 in the top of flange 22.

Referring to FIG. 9, clip 60 or 60a as disclosed in FIG. 6, is securely held in each corner of the shelf by the notched tabs 74 and 76. To assemble, tabs 74 and 76 are aligned with the corresponding apertures 46 and 44 in the shelves, with bearing portion 90 on the side of the shelf having the shoulder 32. The tabs are forced through the apertures 44 and 46 by pressure on the lower flange 66 towards the shelf top 18. The camming surfaces 86 and 88 draw the sides inwardly under stress and they snap back into the spaces 84 when reached whereby the lower flange 66 is diagonally disposed between the side and end flanges with tabs 74 and 76 in the plane of the flanges. Upper flange 64 supports planar shelf surface 18 adjacent to the recessed opening 38 and added support is offered by the ear 90 which supports the flange surface 30 adjacent to the recessed opening 38.

With respect to the clip modification in FIG. 5, after the corresponding parts are inserted as above described, the top of the clip is pressed towards the notch 38 and the tab 94 and tooth 98 snap into their respective apertures to be held in place thereby and also to transmit clamping pressure at the tops of the flanges as well as at the bottoms thereof.

Referring to both embodiments as shown in FIGS. 8 and 9, once a clip 60 is properly positioned in the corner of the shelf, the shelf is clamped to the supporting column by a tension means, two embodiments of which will be described by way of example.

In FIGS. 8a to c is shown one embodiment in which a length of round, or preferably square section spring wire 102 is bent back upon itself to provide a bight portion 104 and the two legs 106 extending therefrom terminate in acute angle fingers 108 whose terminal ends are adapted to engage in or in close proximity to the form lines 14 in the post 12. Preferably the fingers engage end-to-end in their resting position as shown in FIG. 8a and are heat treated. Then when they are inserted from within the shelf flanges through the opening 80 in the clip 60 and through the aperture 48 which is just wide enough to receive them, the bight 104 is quarter turned. With this turn the fingers 108 turn oppositely from each other as restricted in the aperture 48 to engage terminally in said form lines whereupon a wedge 78 is inserted into the bight 104 and driven home (FIG. 12) to establish the clamping pressure necessary to rigidify the shelving assembly.

In the event it is desirable to have the wedge 78 tightened parallel with the plane of the shelf with a vertical aperture 48, the forming of the tension member 102 includes holding the fingers 108 in alignment and turning the bight 104 a quarter turn before heat treating, and, although it is desirable to have the post apertures 48 extend vertically for a better axial compression (L/r) rating, if they were disposed horizontally as shown in FIGS. 9a to c, the above structural description regarding the disposition of the elements in the resting condition of the fingers and bight would be reversed.

In FIGS. 10a to c and 11 the tension member is a stamping 110 formed from heavy strip stock in which a bullet or arrowhead type interlocking member 112 with shoulders 118 on the end of a narrow shaft 114 has its remote end 116 reversibly bent to provide a hook-like bight 104a receiving the wedge 78. The relative orientation of the hook 104a and the head 112 for vertical or horizontal apertures 48 applies here also including considerations of shoulders 118 on the head engaging form line elements when turned crosswise to the aperture 48, it being readily perceived that the use of either is merely nserting the engaging end through the aperture 48, turning and wedging.

It is to be observed in the right half of FIG. 12 that the narrow aperture 48 is capable of receiving the heavy thread 119 of a sheet metal screw 120 as a last resort if the proper tensioning elements described become lost. However, this is what is sought to be avoided because it entails the laborious twisting of a securing element in an awkward position which is eliminated by the present invention. The repeated slippage of a screw driver from the kerf 121 in the head 123 as manually held with knuckles contacting the shelf top 18 is generally objectionable to a purchaser.

In this connection, however, reference is made to FIG. 16 in which the tension member 102 can be tightened by a conical tapering wedge 122 having one or more coarse helical lands 124 thereon defining round bottom grooves receiving the bight 104 of the tension member. The large end of the rotary wedge is cross kerfed at 126 to receive the bit of a screw driver (not shown) whereby once the small end is inserted within the bight 104 of the tension member shown in FIG. 9a as used in the vertical aperture 48 of FIG. 6, the wedge can be advanced as far as it will go by finger pressure and then twisted to a vertical position with the kerf 126 pointing downwardly. Thereupon a screw driver extending downwardly from the shelf can be used to turn the helical wedge clockwise to further advance the wedge and tighten the tension device to the degree desired. The groove not only retains the bight 104 against slippage, thereby enabling the use of a sharply inclined wedge, but the teeth also score into the face of the planar portion 62 of the clip against slippage thereon. The circular character of the kerf or head portion at 126 prevents destruction of the securing system yet provides adequate draft to be exerted thereon since the tensioning device is not only drawn but its bight is expanded to augment the effective draft.

For the purpose of inserting the latching end of either embodiment through aperture 48 the outwardly concave intermediate wall 17 assists in guiding the tension member into its working position, and particularly the arrowhead form 112 which is tapered in both directions. Furthermore, the exposed bight portion 104 can be finger manipulated with space between the aperture 48 and the clip 60 for observation and further guidance if desired. Then the wedge 78 can be used as a quarter twisting lever, if desired, before it is fully driven to its tightened position.

From the foregoing, it will be seen that a shelving construction has been provided which may be readily assembled into a rugged, rigid form and securely held in such form with a minimum of time, effort and tools. By providing a fastening clip 60 that is secured in position by the three mutually perpendicular planes of the side and end flanges and the planar surface of the shelf, not only will the corner portions of the shelves be greatly increased in strength and rigidity, but the drawing force created by the wedge and tensioning device will be equally distributed between the adjacent end and side flanges and the planar surface of the shelf for a favorable L/r relationship and also thereby rigidifying the clamping of the shelf to the support column. Further, when the fastening clip 60 is snapped into position at the corner of the shelf, securement against subsequent disengagement of the clip and rigidity of the corner is greatly enhanced as the weight on the shelf increases.

Additionally, the angular configuration of the side flanges function as a supporting beam for the width of the shelf and in conjunction with the contoured supporting columns and the simple fastening arrangement, an exceptionally lightweight shelving unit is provided capable of supporting weight in excess of that expected of heavier shelving constructions.

Moreover, it is to be noted that the principles of the inventive concept are readily useful for several forms or applications wherein the separation at 56 in one wall 41a as shown in FIG. 12 is attained by shifting the rolling dies outwardly to leave more metal in the front wall 41b when continuous shelving is desired with panels 58 between them. See also the shape in FIG. 15 already described where a decor strip 54 is desired. FIG. 14 shows a post 12d for continuous shelving with a flat front at 41c and where the number of shelf units are known that are going to be connected not only may the correct number of intermediate posts 12a be supplied with the order but matching corner posts 12b as shown in FIG. 13 are supplied.

The constructions herewith described and disclosed may be utilized in numerous applications and in a variety of specific structures, while its ease of manufacture and assembly, its clean and attractive outline and freedom from exposed edges make it particularly useful in all installations where metal shelving is currently in use.

What is claimed is:

1. In a metal shelving assembly a shelf having a planar portion and a plurality of depending peripheral flanges, a pair of said flanges being aligned in predetermined spaced relationship at a corner of the shelf to define a vertically extending recessed opening, retaining apertures formed through vertically spaced portions of the flanges adjacent to the recessed opening, a support column of strip metal formed with two side wall portions disposed at a right angle to each other having a pair of longitudinally parallel form lines defining internal angles along adjacent edges of the side wall portions bounding a narrow recessed intermediate wall portion disposed diagonally between said wall portions and having vertically spaced apertures therethrough, securing means including a clip having a hole centrally formed therethrough spaced from and in alignment with one of said vertically spaced apertures and vertically spaced tab portions formed thereon received in said retaining apertures, and tension means inserted from within said shelf through said hole and terminally received within the support column through said aperture and rotatable to internally span the aperture and engage therearound the diagonal wall portion in tension with said clip to clamp the flanges rigidly against said side wall portions of said support column.

2. In a metal shelving assembly the combination of a roll formed column having vertically spaced elongated apertures between side wall portions disposed at right angles to each other, a shelf having flanges with corner notched flange ends abutting said side wall portions, shelf securing means interconnecting said flanges and said column including a clip member interengaging the flanges, a tension member having a latching means at one end received through one of said elongated apertures to engage inner wall portions of the side walls thereof around said aperture by a quarter turn and a bent portion at the other end defining a bight, and wedge means interengaging said clip member and bight to hold said flange ends rigidly against said side wall portions.

3. The shelving assembly of claim 2 in which said latching means comprises a flat head portion defining shoulders engaging said inner wall portions.

4. The shelving assembly of claim 2 in which said tension member is a wire member looped back upon itself to form said bight and said latching means comprises angularly disposed fingers at the ends of the legs disposed in a common plane in their resting position and in their working position disposed in parallel planes by said quarter turn.

5. The shelving assembly of claim 2 in which said clip member spans said corner notch and has elements interlocking with said flanges at points spaced from their ends under resilient flexure thereof and has a central flat portion having a hole therein in alignment with said one of said apertures receiving said bight, said wedge means being received in sliding relation on said flat portion in said bight for rotating said bight said quarter turn.

6. The shelving assembly of claim 2 in which said flanges have an L-shaped configuration including an outer portion and inwardly directed vertically spaced portions retaining apertures formed through the lower inwardly directed portion, and said clip member has an intermediate planar wall portion with a hole therethrough, an offset member forming a flange facing said hole on the column side to reinforce said intermediate portion, end portions extending beyond said offset member for insertion in said retaining apertures, said wedge means slidably engaging said planar wall portion for rotating the bight a quarter turn in said hole before tightening, and means on said clip member obstructing a turning of the wedge means after tightening.

7. The shelving assembly of claim 6 in which retaining apertures are formed in the upper inwardly directed portion and said means on said clip member includes tabs engaging in the last mentioned retaining apertures.

8. In a metal shelving assembly the combination of a roll formed column of strip metal defining an essentially octagonal cross section where adjacent side walls are defined by internally acute-angle form lines and at least two alternate side walls have vertically spaced apertures, shelf means notched at the corners to engage the walls adjacent at least one of said alternate side walls, and adjustable means for securing the shelf means rigidly in place included shoulder elements bridging one of said apertures and engaging in the form lines on opposite sides of said one aperture.

9. In a metal shelving assembly the combination of a roll formed column of strip metal having a pair of longitudinally parallel form lines defining internal angles along adjacent edges of side wall portions disposed at a right angle to each other and defining a narrow intermediate wall portion between them disposed diagonally to said side wall portions and having vertically spaced apertures *of a size to receive a screw threadably* therethrough, a shelf having corner notched flange ends abutting said side wall portions at right angles thereto, *and having retaining apertures spaced from the corner notch,* clip means *having tabs that snap in said retaining apertures* interengaging said flanges and spaced from the intermediate wall portion to secure said flange ends rigidly against said side wall portions, and an elongated element extending through one of said *spaced* apertures and rotatable to interlock with the inner wall portions of the intermediate wall portion around the *spaced* aperture.

10. The shelving assembly of claim 9 in which said *spaced* apertures are vertically elongated and said elongated element terminally has shoulders interlocking with the lateral walls of said *spaced* aperture and engaging at least one of said form lines.

11. The shelving assembly of claim 9 in which said inter-engaging means is a U-shaped wire member with the bight portion disposed in one plane in its resting position and right angle fingers terminally on the legs disposed in another plane normal to said one plane.

12. In a metal shelving assembly the combination of an essentially rectangular column of rolled strip metal having at least two spaced pairs of longitudinally parallel form lines defined between one side wall and the two adjacent side walls that are disposed at right angles thereto, two narrow intermediate wall portions disposed diagonally to said side walls with one of the intermediate side walls disposed between each pair of form lines and having vertically spaced apertures *of a size to receive a screw threadably* therethrough, two shelving means each having corner notched flange ends abutting said side walls on opposite sides of each intermediate wall portion *and having retaining apertures spaced from said ends,* securing means *having tabs received in said retaining apertures for* interengaging the notched flange ends of each shelving means, and tension means interengaging one of said *spaced* apertures in each one of said intermediate wall portions and one of the securing means under tension securing said flanges rigidly against said abutted side walls.

13. The combination of claim 12 in which said form lines define included acute angles.

14. The combination of claim [12] *1* in which said intermediate wall portions are externally concave.

15. The combination of claim 12 in which said securing means engage said one intermediate wall *in proximity to* [at] said form lines.

16. The combination called for in claim 2 in which said wedge means comprises a conical member rotatable on its axis and having helical land and groove elements engaging the bight of said tension member.

17. A metal shelving assembly comprising a shelf having a planar portion and depending peripheral side and end flanges terminating a spaced distance from each other at the corners of the shelf in cut edges that are disposed at right angles to each other to define recessed openings, a plurality of support columns, each having a pair of form lines defining side wall portions disposed at a right angle to each other and an intermediate wall portion between them having vertically spaced apertures therethrough, said side and end flanges terminally abutting said side wall portions at right angles thereto, clip means engaging said flanges at a distance spaced from said cut edges to hold the shelf against the support column and having a hole therethrough adjustably disposed opposite to one of said apertures, tension means received through said hole and said aperture interengaging at one end with said intermediate wall around said aperture, and wedge means interengaging the clip means and other end of said tension member to tension it and clamp said cut edges of the flanges against said side wall portions.

References Cited

The following references, cited by the Examiner, are of record in the patented file of this patent or the original patent.

UNITED STATES PATENTS

| | | | |
|---|---|---|---|
| 1,014,630 | 1/1912 | Morrill | 287—20.925 |
| 1,506,442 | 8/1924 | O'Hara | 287—20.925 |
| 1,784,572 | 12/1930 | Brown | 287—189.36 |
| 1,952,111 | 3/1934 | Bales | 248—243 |
| 2,195,611 | 4/1940 | Brown | 287—189.36 |
| 3,180,663 | 4/1965 | Lehmann | 287—305X |
| 3,255,722 | 6/1966 | Ferdinand | 211—148X |

FOREIGN PATENTS

| | | | |
|---|---|---|---|
| 612,120 | 11/1948 | Great Britain | 287—20.925 |

JAMES T. McCALL, Primary Examiner

U.S. Cl. X.R.

108—153; 287—20.92, 189.36